(12) United States Patent
Garnweidner

(10) Patent No.: US 7,832,793 B2
(45) Date of Patent: Nov. 16, 2010

(54) PEDESTRIAN GUARD FOR A MOTOR VEHICLE

(75) Inventor: Peter Garnweidner, Lamprechtshausen (AT)

(73) Assignee: Euromotive GmbH, Ranshofen (AT)

( * ) Notice: Subject to any disclaimer, the term of this patent is extended or adjusted under 35 U.S.C. 154(b) by 344 days.

(21) Appl. No.: 11/842,216

(22) Filed: Aug. 21, 2007

(65) Prior Publication Data

US 2008/0042454 A1 Feb. 21, 2008

(30) Foreign Application Priority Data

Aug. 21, 2006 (DE) .................... 10 2006 039 163

(51) Int. Cl.
*B60R 21/34* (2006.01)
*B62D 25/08* (2006.01)

(52) U.S. Cl. ................... 296/187.04; 296/198; 180/274

(58) Field of Classification Search .............. 180/69.21, 180/274; 296/187.04, 193.11, 187.09, 198, 296/187.1, 193.09
See application file for complete search history.

(56) References Cited

U.S. PATENT DOCUMENTS

| | | | | |
|---|---|---|---|---|
| 4,359,120 A * | 11/1982 | Schmidt et al. | ......... | 296/187.04 |
| 6,258,465 B1 * | 7/2001 | Oka et al. | .................... | 428/599 |
| 6,547,316 B2 * | 4/2003 | Chung | ................... | 296/187.03 |
| 6,554,341 B2 * | 4/2003 | Lee | ............................. | 296/29 |
| 6,767,052 B2 * | 7/2004 | Kubota | .................. | 296/203.02 |
| 7,192,080 B2 * | 3/2007 | Marijnissen et al. | ........ | 296/198 |
| 7,204,545 B2 * | 4/2007 | Roux et al. | ............ | 296/187.09 |
| 7,354,030 B2 * | 4/2008 | Murayama et al. | .......... | 267/140 |
| 7,497,503 B2 * | 3/2009 | Ito | ........................ | 296/187.04 |
| 2005/0057076 A1 * | 3/2005 | Roux et al. | ................. | 296/198 |

FOREIGN PATENT DOCUMENTS

| | | |
|---|---|---|
| DE | 1 241 625 B | 6/1967 |
| DE | 28 50 723 A1 | 5/1979 |
| DE | 691 10 872 T2 | 2/1996 |
| DE | 198 30 560 A1 | 5/1999 |
| DE | 100 60 636 A1 | 7/2002 |
| DE | 103 08 371 A1 | 9/2004 |
| DE | 109 09 958 A1 | 9/2004 |
| DE | 203 21 022 U1 | 11/2005 |
| EP | 1 510 411 A1 | 3/2005 |
| JP | 2004-090910 A | 3/2004 |
| JP | 2005075344 A * | 3/2005 |

OTHER PUBLICATIONS

European Search Report dated Oct. 23, 2009 for No. EP 10711 4255.

* cited by examiner

*Primary Examiner*—Patricia L Engle
(74) *Attorney, Agent, or Firm*—Roberts Mlotkowski Safran & Cole, P.C.; David S. Safran

(57) ABSTRACT

A pedestrian guard for a motor vehicle is designed to protect persons in the event of a collision with the motor vehicle. At least one profile section (2) with a honeycomb cross section is arranged between the component of the motor vehicle against which a person impacts in the event of collision with the motor vehicle, in particular, between the fender (1) and the component of the motor vehicle (5) to which the impacted component is connected. The profile section is produced of an aluminum material that is in a soft annealed state.

8 Claims, 7 Drawing Sheets

PEDESTRIAN GUARD FOR A MOTOR VEHICLE

BACKGROUND OF THE INVENTION

1. Field of the Invention

The invention relates to a pedestrian guard for a motor vehicle for protecting persons in the event of collision with the motor vehicle.

2. Description of Related Art

In the event of a collision between a person, in particular a pedestrian, and a motor vehicle, the accident process is normally divided into three impact zones, namely the leg region, the hip region and the head region of the person impacted.

The leg impact takes place essentially in the region of the bumper of the motor vehicle, the hip impact takes place, in particular, in the region of the so-called lock connections, e.g., the connection of the lock of the front hood or bonnet to the frame of the motor vehicle, and the head impact has its essential danger points in the windscreen wipers, in the region of the hood in which the engine block lies directly underneath, and in the connection of the fenders to the upper auxiliary side member, i.e., the side member immediately underneath the joint between the fender and the hood.

This invention relates to a pedestrian guard which is intended to protect the person who suffers a hip impact and a head impact.

What is particularly problematic in the event of such an impact is the connection of the fender to the auxiliary side member, because the latter is being constructed with increasing stiffness in motor vehicles to provide homogeneous stiffness of the front section of the motor vehicle.

Since the front body sections, for example, the fenders and the front hood, not only act in an energy-absorbing manner, but they should also be stiffly constructed for normal use in other directions of loading, further demands are imposed here. In this case, particular consideration must be given to suction forces during travel and lateral forces on the fender, which forces may be generated when persons lean against the vehicle.

Apart from these planar connections, e.g., the connection of the fenders to the frame of the motor vehicle, punctual connection points, e.g., the bonnet lock connection, are also problem zones. The problem here lies not only in the installation conditions, but also in the fact that suction forces are generated in the direction opposite to the direction of deformation, so that different levels of force are required in a suitable collision guard under a tensile or compressive stress.

In this connection, a method is known in the prior art for providing deformable sheet steel straps at the connection of the fenders to the frame of the motor vehicle. The disadvantage of this design, however, lies in associated low torsional stiffness which has a negative effect in the case of forces which act laterally and are produced, for example, when a person leans against the vehicle.

A further disadvantage of the prior art design is the low energy absorption. As rectangular a force-distance curve as possible in the direction of protection is important in the case of a head impact.

A further problem arises from the fact that the mass of the head of children and adults differs considerably, the head of an adult being assumed at present to have a mass of 4.5 kg and the head of a child to have a mass of between 2.5 kg and 3.5 kg. Since the seriousness of injuries is measured in HIC's, and since the HIC value is a function of retardation, a higher retardation is automatically obtained at a lower mass, i.e., in the case of impact of the head of a child, if a deformation element is present, e.g., a deformable sheet steel strap with only one force stage.

SUMMARY OF THE INVENTION

A primary object of the invention therefore is to provide a pedestrian guard for a motor vehicle which is designed so that the hard connection points between the body sections, such as the fenders or the front hood or bonnet and the frame or body of the vehicle are energy absorbing to the extent that the maximum permissible values for pedestrian protection, i.e., in particular, the head retardations and hip loads, are not exceeded.

This object is achieved according to the invention by at least one profile section with a honeycomb cross section being arranged between the component of the motor vehicle against which a person impacts in the event of collision with the motor vehicle and a component of the frame of the motor vehicle connected to it, with the profile element being made of an aluminum material in a soft annealed condition.

The pedestrian guard according to the invention for a motor vehicle meets the requirements regarding the maximum permissible values in the event of a collision with a pedestrian, particularly with regard to the head retardations and hip loads, and has the additional advantage that the installation space is as small as possible, i.e., the block length is as small as possible, that different force levels can be provided for the head of a child and that of an adult, that there is high efficiency, i.e., a constant force level along the path of deformation, that no or only few appreciable modifications are required in the painting process, that its operation is independent of the ambient temperature, i.e., is not dependent on seasons, that simple replacement is possible in case of repair, that the fender connection is of a torsionally stiff design, and that different force levels can be provided in the tensile and compression direction, as required, which is of particular significance at punctual connection points, such as lock connections, particularly, the connection of the hood lock.

Particularly preferred further development and designs of the pedestrian guard according to the invention are described in detail in the following with reference to the associated drawings.

DETAILED DESCRIPTION OF THE INVENTION

Figure 1:
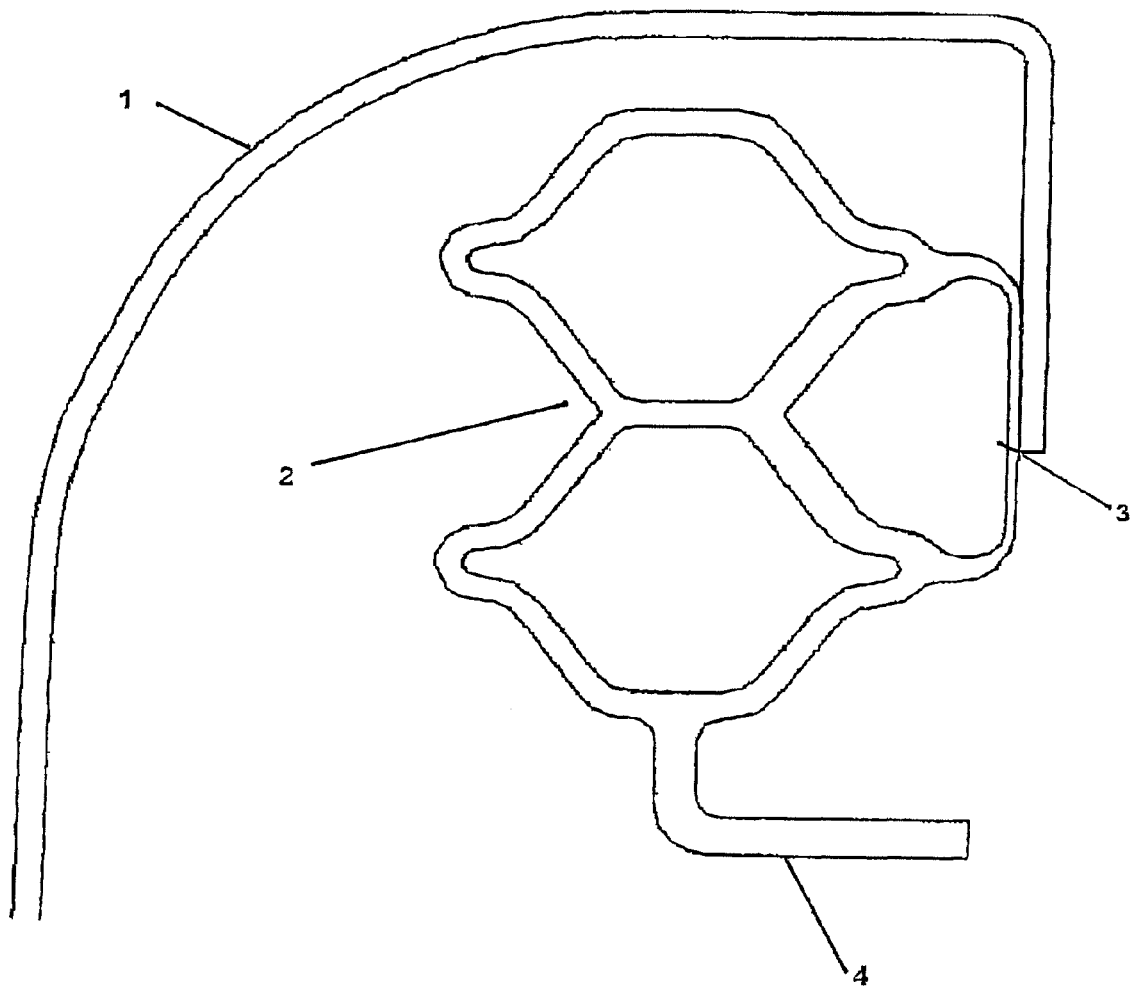
FIG. 1 shows a horizontal sectional view through a first embodiment of the pedestrian guard according to the invention for use at the fender connection.

FIG. 1 shows an exemplary embodiment of the pedestrian guard according to the invention for a motor vehicle for protecting persons in the event of a collision with the motor vehicle, particularly in the event of impact against a fender 1.

Figure 2:
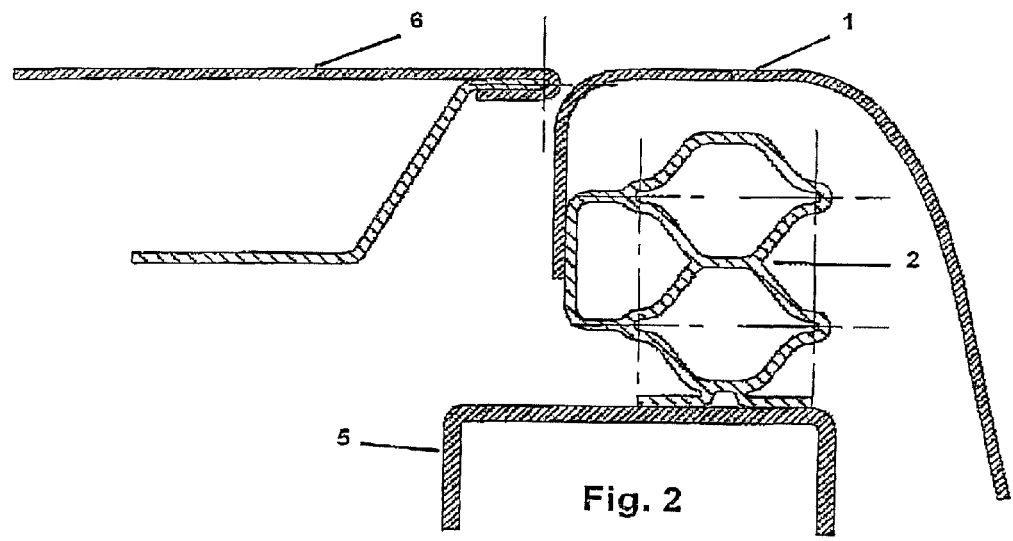
FIGS. 2 & 3 are sectional views, corresponding to FIG. 1, of two different arrangement possibilities for the pedestrian guard shown in FIG. 1.

As is shown in FIG. 2, fender 1 of a motor vehicle is connected to the upper auxiliary side member 5 of the frame of the motor vehicle.

This connection is made according to FIG. 1 by means of a strip-shaped or elongated profile section 2 with a honeycomb, i.e., essentially hexagonal cross section, that is arranged between the fender 1 against which a person collides and the upper auxiliary side member 5. The connection of profile section 2 to fender 1 is, in this case, established by means of a flange 3 formed on it and connection of profile section 2 on the upper auxiliary side member 5 is achieved by means of a further flange 4.

Figure 3:
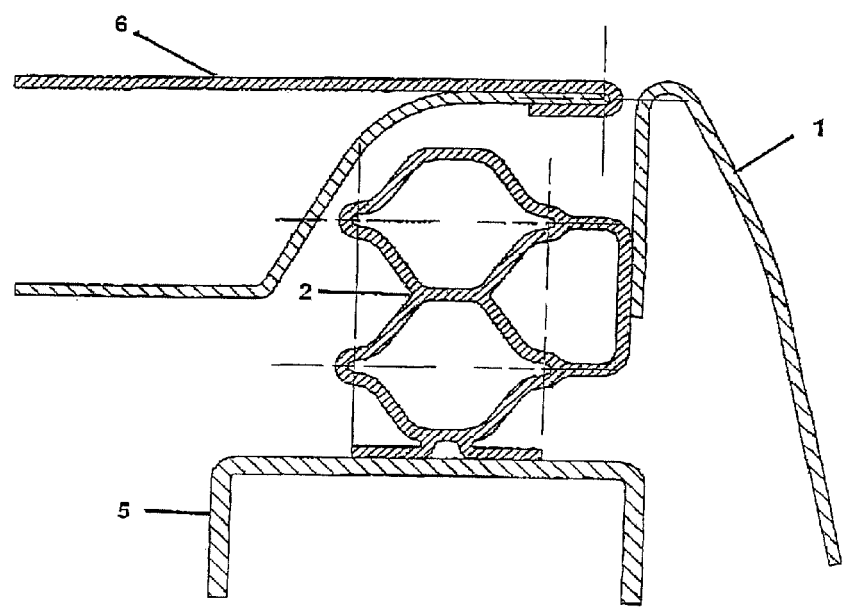

In the exemplary embodiment shown in FIG. 2, profile section 2 is located in the installation space underneath fender 1. As shown in FIG. 3, however, profile section 2 may also be located in the installation space underneath the front hood or bonnet 6.

Figure 5:
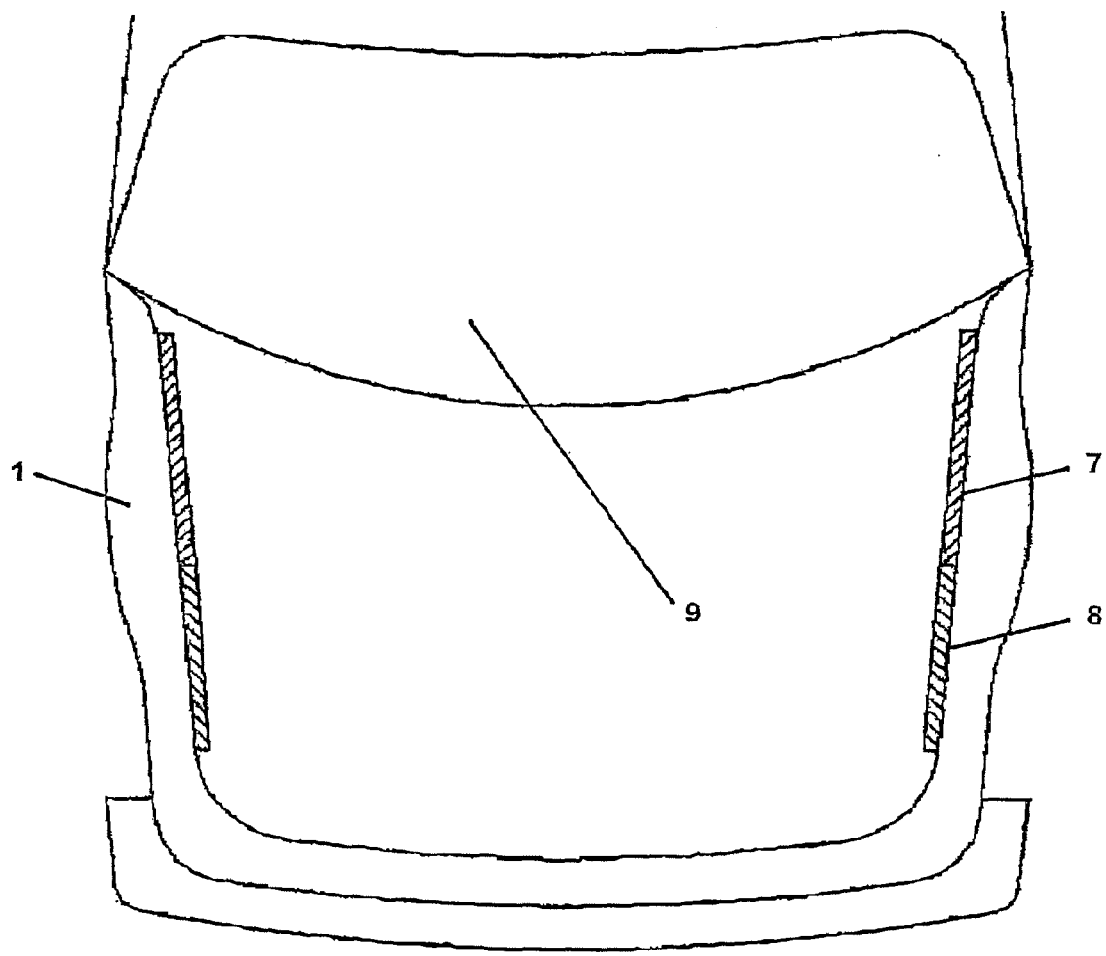
FIG. 5 is an elevation view of the forecarriage of a motor vehicle in order to represent the different impact regions of the head of an adult and a child.

As shown in FIG. 5, and as described in detail later, the strip-shaped profile section is provided, in particular, in the engine compartment of the motor vehicle along the joint between fender 1 and the upper auxiliary side member 5, i.e., in the longitudinal direction of the motor vehicle.

Profile section 2 is made of an aluminum material in the soft annealed state according to DIN EN 515 Number 4.2.

A honeycomb cross section in this context is understood to mean a cross section such as that shown in FIG. 1, for example. This cross sectional shape is formed of an essentially regular hexagon with parallel diametrically opposite sides, shoulders preferably being provided on two opposing corners, in particular circular shoulders. As a result of this design the honeycomb is given a kind of lemon shape.

The wall thickness of profile section 2, with a honeycomb shape, is 1 mm or more. This provides a hollow deformation body with a certain deformation behavior, which body nevertheless has a total stiffness sufficient to withstand the loads which are generated during normal use of the vehicle. Deformations or damage due to aerodynamic forces, for example, at high vehicle speed, do not occur. However, the profile shape guarantees that a local softness is provided which ensures a deformation, i.e., yielding in the event of collision with a person.

Figure 4:
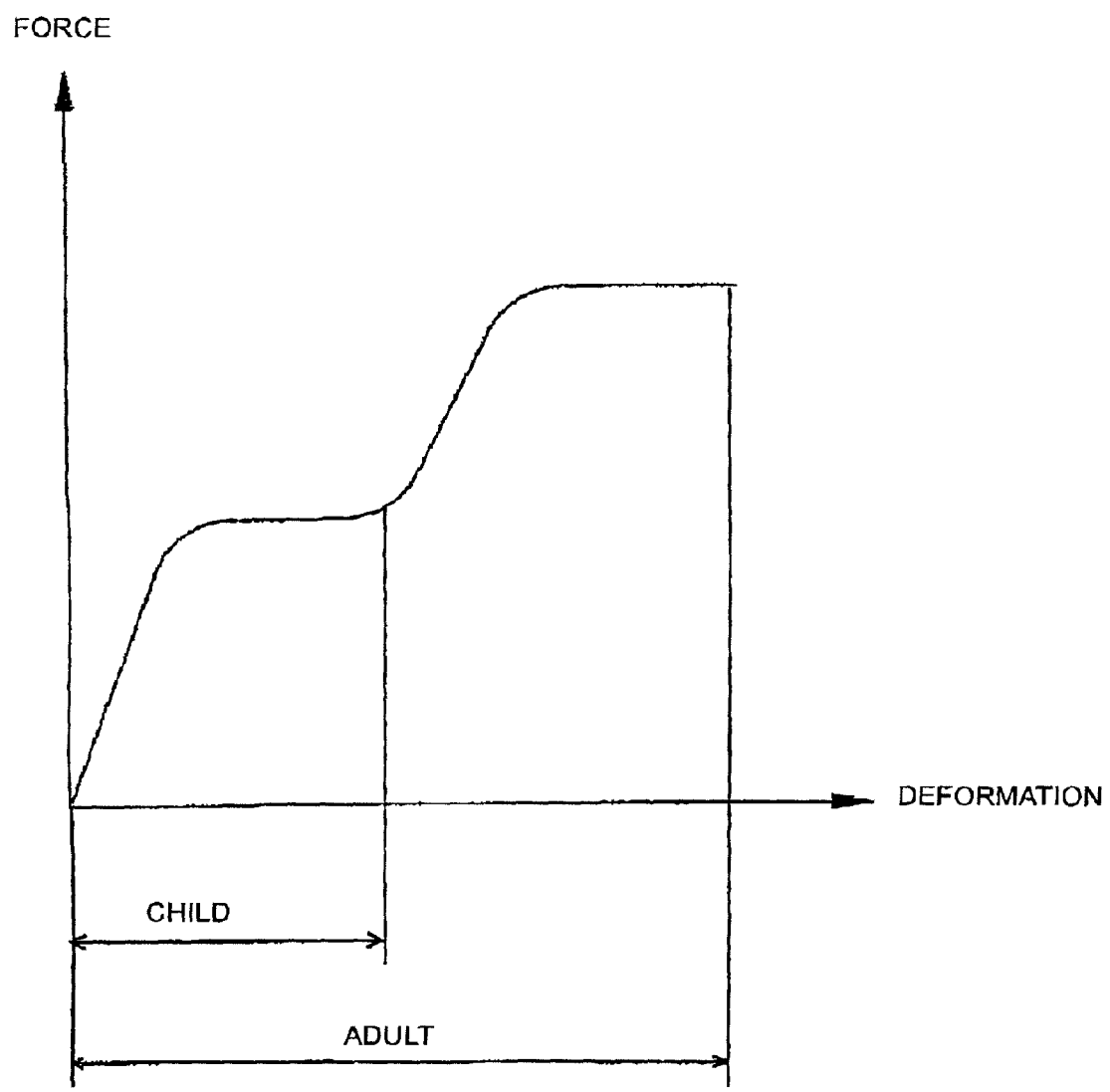
FIG. 4 is a force deformation graph showing the typical deformation behavior of the pedestrian guard shown in FIG. 1.

The deformation behavior of a pedestrian guard with the construction shown in FIGS. 1 to 3 is shown in FIG. 4.

The connection of the corresponding components of the motor vehicle is designed so that a linear energy absorbing function is provided. Here, the energy absorption is shown as rectangular a force deformation path as possible, as shown in FIG. 4. In this case the design is additionally torsionally stiff, so that when a person leans against the fender, the required stiffness is provided.

Profile section 2 with a honeycomb cross section or honeycomb structure is designed, in particular, as an extruded profile section, where an intermediate plate can be arranged to simplify the screw connection in the case of complicated geometries.

In the event of an impact, particularly a head impact, the honeycomb structure of profile section 2 is deformed and energy is reduced. A particular advantage of this is that the profile section can be designed in the manner shown in FIGS. 1 to 3 as a multiple honeycomb hollow body, in particular a double honeycomb hollow body, in order to take account of the requirement for different force levels for the head of a child or an adult. For this purpose provision is made in FIG. 1 for a so-called soft honeycomb with low strength on the side of fender 1 which is deformed in the event of impact of the head of a child, and a so-called hard honeycomb, with a hardness which is dimensioned for the impact of the head of an adult, located behind it.

The corresponding deformation behavior of such a double honeycomb construction is shown in FIG. 4. At the beginning of the deformation, at a low force, a rectangular force deformation path is produced because of the front honeycomb, serving to absorb the impact energy from the impact of the child's head, followed by the deformation region for the impact of an adult's head, which also describes a rectangular force deformation path, and which must return to the hard honeycomb located behind the front soft honeycomb.

As shown in FIG. 5, the impact of a child and the impact of an adult also differ in that the head striking region of a child's head lies further forward on the vehicle, while an adult's head impacts against a rear region of the vehicle. In order to meet the requirements resulting from this, two different profile sections, 7, 8, in particular, two different extruded profiles, may be provided in the case of the pedestrian guard according to the invention at front and rear areas of the fender, i.e., in the region of the impact of the child's head and in the region of impact of the adult's head.

However, it is also possible to provide a profile section which has a hardness which is selected for the impact of a child's head but which is secured in the rear region by foaming.

Profile section 2 provided according to the invention has, according to FIG. 1, a honeycomb cross section, by which is meant an essentially hexagonal cross section which may be rounded at its corners. Furthermore, the shape may be such that two diametrically opposite corners of the cross sectional shape have circular shoulders.

Exemplary embodiments have been described above for the connection, in particular, of the fender to the frame of the motor vehicle.

In the case of point connections, for example, the connections of a lock, such as the hood lock; the basic structure of the pedestrian guard is similar.

In the case of point connection points, however, consideration must be given to the fact that it may also be necessary to keep the force level in the direction of protection lower than in a direction opposite to it. An example of this is the lock connection of a hood lock for which a compressive force of 3 kN must be accommodated for impacts, whereas a tensile force of at least 5 kN must be resisted for suction forces arising from the vehicle operation.

To meet these requirements, the honeycomb structure of the profile section may be reinforced by denting or buckling bridges. Examples of these are shown in FIGS. 6-8.

Figure 6:
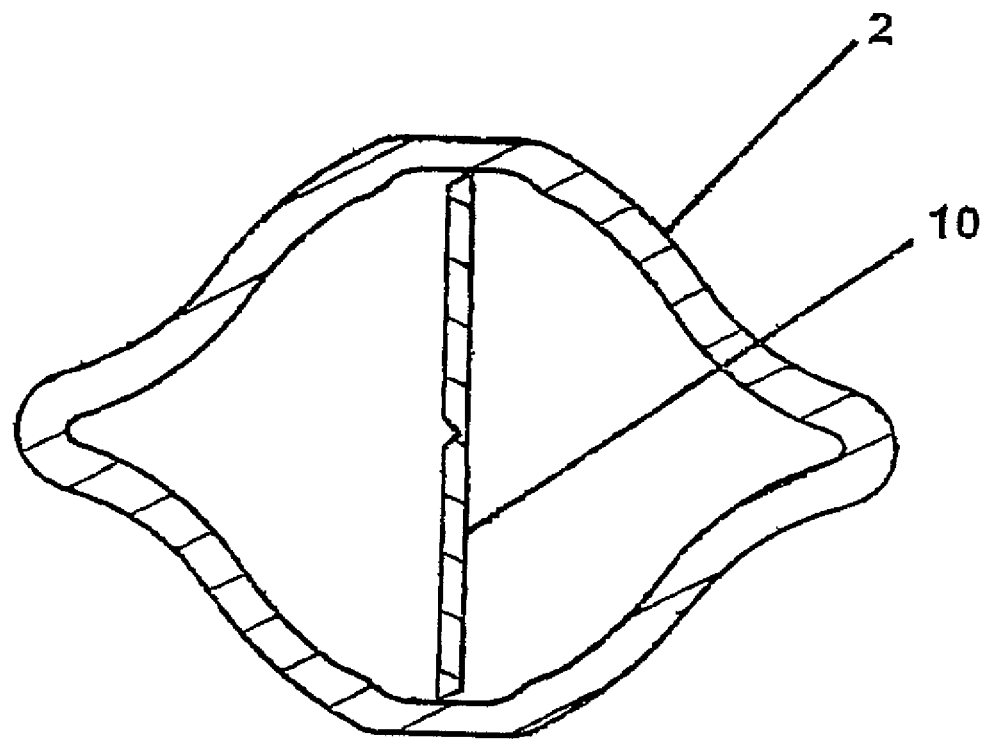
FIG. 6 is a cross sectional view of a honeycomb profile section for an embodiment of the pedestrian guard according to the invention for connection at points.

In the exemplary embodiment shown in FIG. 6, a reinforcing plate 10 is provided as a bridge, which plate has a groove as a line of weakness in its center. The protective function takes place in the direction of compression parallel to reinforcing plate 10, while in the tensile direction, opposite the direction of compression, reinforcing plate 10 prevents a deformation of honeycomb-like profile section 2.

Figure 7:
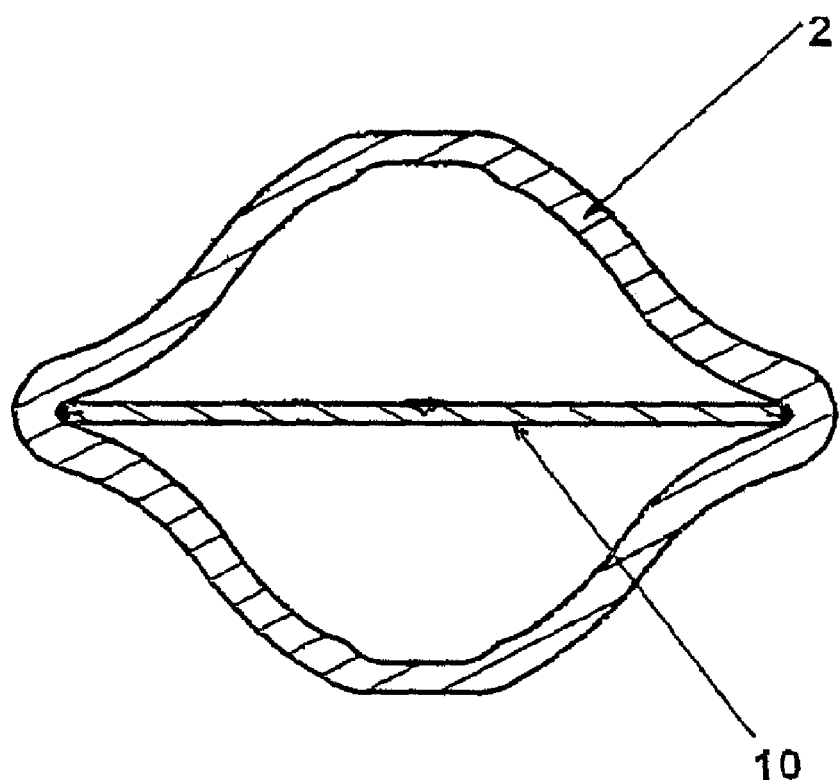
FIG. 7 is a view corresponding to FIG. 6 of another embodiment of the honeycomb profile section for connection at points.

FIG. 7 shows an example of an embodiment in which a reinforcing plate 10 is provided which is inserted in profile section 2 perpendicularly to the direction of force. Under compressive stress perpendicular to reinforcing plate 10, the reinforcing plate 10 is ineffective in this exemplary embodiment, while under tensile stress it prevents deformation of honeycomb-like profile 2. This ensures that the profile has a soft reaction to pressure and a hard reaction to tension.

Figure 8:
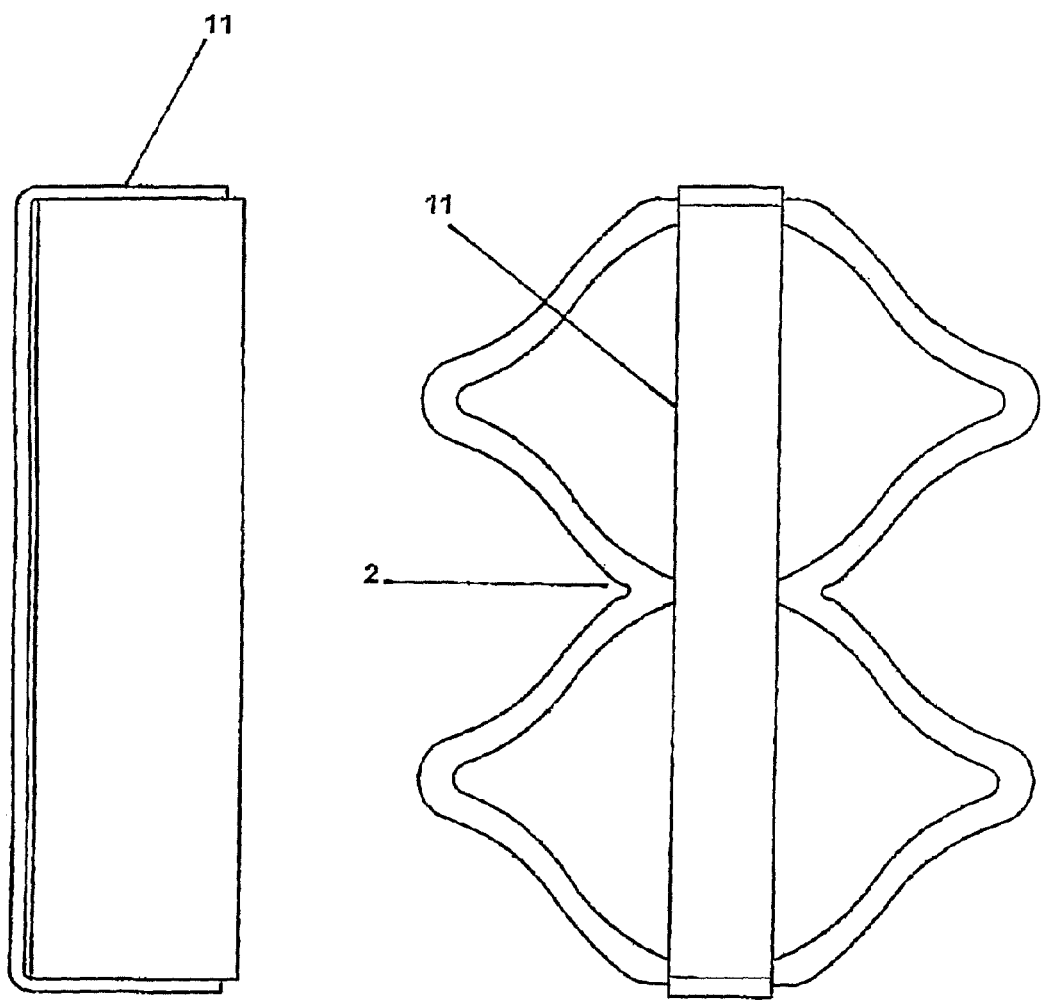
FIG. 8 shows views from two sides of a further embodiment of the pedestrian guard according to the invention for connection at points.

Finally, FIG. 8 shows an embodiment of a double construction with a lateral reinforcing plate 1. In this exemplary embodiment, the protective function takes place in the direction of the compressive force parallel to the reinforcing plate, which is connected to profile section 2 at the top and bottom and runs unconnected along the sides of the profile section 2. Under compressive stress reinforcing plate 11 buckles outwards, while under tensile stress it prevents deformation of profile section 2.

Reinforcing plates 10, 11 may also be formed in the extruded profile or may be inserted as an additional component.

What is claimed is:

1. A pedestrian guard for a motor vehicle for protecting persons in the event of collision with the motor vehicle, comprising at least one profile section with a hexagonal cross-section which is arranged between an exterior component of the motor vehicle, against which a person might impact in the event of collision with the motor vehicle, and a component of a frame of the motor vehicle connected to it, the at least one profile being made of an aluminum material in a soft annealed state, wherein the hexagonal cross-section has rounded corners and circular shoulders on two diametrically opposed corners and wherein a reinforcement plate is arranged in the hexagonal cross-section in a manner preventing deformation of the profile section when a tensile force is applied to the profile section perpendicularly to a direction of extension the reinforcement plate and being ineffective when a compressive force is applied to the profile section perpendicularly to the direction of extension of the reinforcement plate.

2. The pedestrian guard according to claim 1, where the at least one profile section comprises multiple profiles of hexagonal cross section, wherein individual profiles of hexagonal cross section have different hardnesses.

3. The pedestrian guard according to claim 1, wherein the at least one profile section comprises profiles of different hardnesses provided one behind another in front and rear regions of said exterior component.

4. The pedestrian guard according to claim 3, wherein a profile section with a lower hardness is arranged in the front region, and a profile section with a higher hardness is arranged in the rear region of said exterior component.

5. The pedestrian guard according to claim 1, where the reinforcing plate is arranged parallel to a direction in which compressive stresses are generated so that reinforcing plate buckles outwards under said compressive stresses.

6. The pedestrian guard according to claim 5, wherein the reinforcing plate is provided with a weakened area in a center portion thereof.

7. The pedestrian guard according to claim 1, wherein the reinforcing plate is arranged perpendicularly to a direction in which compressive stresses are generated so that the profile has a soft reaction to pressure and a hard reaction to tension.

8. The pedestrian guard according to claim 1, wherein a lateral plate extends along the outside of lateral sides of the at least one profile section and is fixed at top and bottom sides thereof.

* * * * *